United States Patent [19]

Minnick

[11] Patent Number: 5,284,903
[45] Date of Patent: Feb. 8, 1994

[54] BLENDS OF POLYETHERIMIDE RESINS AND POLYESTER RESINS DERIVED FROM A CYCLOHEXANEDIMETHANOL AND A CARBOCYLIC ACID OR ESTER

[75] Inventor: Michael G. Minnick, Coshocton, Ohio

[73] Assignee: General Electric Company, Pittsfield, Mass.

[21] Appl. No.: 996,364

[22] Filed: Dec. 23, 1992

Related U.S. Application Data

[63] Continuation of Ser. No. 544,965, Jun. 28, 1990, abandoned.

[51] Int. Cl.$^5$ .............................................. C08L 79/08
[52] U.S. Cl. .................................... 524/538; 524/334; 524/415; 525/425; 525/436
[58] Field of Search ................ 525/425, 436; 524/415, 524/334, 538

[56] References Cited

U.S. PATENT DOCUMENTS 4,141,927 2/1979 White et al. .......................... 525/432
4,578,453 3/1986 Jackson, Jr. et al. ................ 528/302

*Primary Examiner*—Ana L. Carrillo

[57] ABSTRACT

The present invention teaches polyetherimide blends which are comprised of at least one polyetherimide resin and at least one polyester resin derived from a cyclohexanedimethanol and a carbocylic acid. These blends can be utilized in applications requiring improved impact strengths compared to unmodified polyetherimide compositions.

14 Claims, No Drawings

BLENDS OF POLYETHERIMIDE RESINS AND POLYESTER RESINS DERIVED FROM A CYCLOHEXANEDIMETHANOL AND A CARBOCYLIC ACID OR ESTER

This is a continuation of copending application(s). Ser. No. 07/544,965 filed on Jun. 28, 1990" now abandoned.

BACKGROUND

The present invention relates to a class of polyetherimide blends comprising a specified polyetherimide and a polyester that have certain improved physical properties.

Certain blends of polyetherimides and other polymers are known. For example, U.S. Pat. No. 4,259,458 discloses a blend containing a polyarylate, a polyester, and at least one thermoplastic polymer selected from the group consisting of an aromatic polycarbonate, a styrene resin, an alkyl acrylate resin, a polyurethane, a vinyl chloride polymer, a poly(aryl ether), a copolyetherester block polymer or a polyhydroxyether. High molecular weight polyesters and particularly linear polyesters derived from 1,4-cyclohexane-dimethanol have been available for a number of years. These are described inter alia in Kilber et al, U.S. Pat. No. 2,901,466. This patent discloses that such polyesters are particularly advantageous as film and fiber-formers.

It has now been unexpectedly discovered that blends of a specified polyetherimide resin and a poly(cyclohexane-dimethylene arylate) exhibit an improvement in impact strength and other improved physical properties over the unmodified polyetherimide resins. The compositions disclosed herein have utility in injection molding, extrusion and other plastic forming operations.

SUMMARY OF THE INVENTION

In accordance with the present invention, a polyetherimide blend is prepared comprising at least one specified polyetherimide resin and at least one polyester resin derived from a cyclohexanedimethanol and a carbocylic acid or ester. These blends exhibit improved impact strengths when compared to an unmodified polyetherimide blend or a polyetherimide blend modified with a different polyester resin.

DETAILED DESCRIPTION

The invention relates to a class of polyetherimide blends comprised of the following elements: (1) a polyetherimide, and (2) at least one polyester resin derived from a cyclohexanedimethanol and a carbocylic acid or ester. Preferably these blends are comprised of, per 100 total parts by weight of polyetherimide and polyester, from about 1 to about 50 parts by weight of the specified polyester, more preferably from about 5 to about 40 parts by weight of the specified polyester and most preferably from about 10 to about 40 parts by weight of the specified polyester. These blends exhibit dramatically improved impact strengths, as compared to the impact strengths of the unmodified polyetherimide compositions or of polyetherimide compositions modified with other polyester compositions that are not specified as being a part of the present invention.

The blends of the invention include a polyetherimide of the formula I:

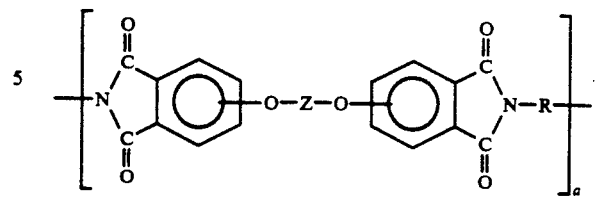

where "a" represents a whole number in excess of 1, e.g. 10 to 10,000 or more, Z is a member selected from the class consisting of (1):

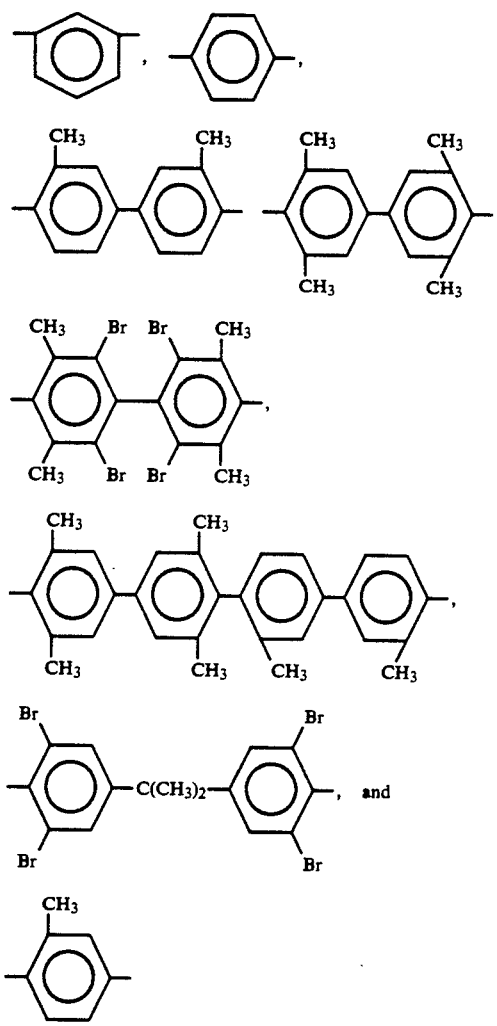

and (2) divalent organic radicals of the general formula:

where X is a member selected from the class consisting of divalent radicals of the formulas,

where q is 0 or 1, y is a whole number from 1 to 5, and divalent bonds of the —O—Z—O—radical are situated on the phthalic anhydride end groups, e.g., in the 3,3', 3,4', 4,3', or the 4,4' positions, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from about 2 to about 20 carbon atoms, $C_2$–$C_8$ alkylene terminated polydiorganosiloxane, and (3) divalent radicals of the formula:

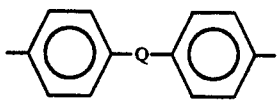

where Q is a member selected from the class consisting of:

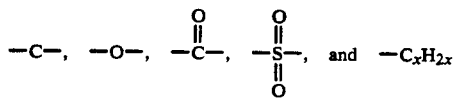

where x is a whole number from 1 to 5 inclusive.

The polyetherimides can be obtained by any of the methods well known to those skilled in the art including the reaction of any aromatic bis(ether anhydride) of the formula:

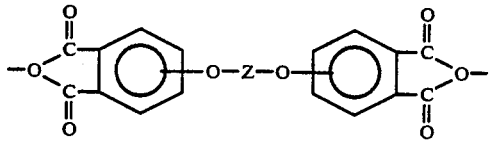

where Z is as defined above with an organic diamine of the formula

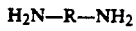

where R is as defined above.

Aromatic bis-(ether anhydride)s of the above formula include, for example 2,2-bis[4-2,3-dicarboxyphenoxy)-phenyl]-propane dianhydride;

4,4'-bis(2-dicarboxyphenoxy)diphenyl ether dianhydride; 1,3-bis(2,3 dicarboxyphenoxy)benzene dianhydride;

4,4'-bis(2,3-dicarboxyphenoxy)diphenyl sulfide dianhydride;

1,4'-bis(2-dicarboxyphenoxy)benzene dianhydride; 4,4'-bis(2,3-dicarboxyphenoxy) benzophenone dianhydride;

4,4'-bis(2,3-dicarboxyphenoxy)diphenyl sulfone dianhydride;

2,2-bis[4-(3,4-dicarboxyphenoxy)phenyl]propane dianhydride;

4,4'bis(3,4-dicarboxyphenoxy)diphenyl ether dianhydride;

4,4'-bis(3,4-dicarboxyphenoxy)diphenyl sulfide dianhydride;

1,3-bis(3,4-dicarboxyphenoxy)benzene dianhydride;
1,4-bis(3,4-dicarboxyphenoxy)benzene dianhydride,
4,4'-bis(3,4-dicarboxyphenoxy)benzophenone dianhydride;

4-(2,3-dicarboxyphenoxy)-4'(3,4-dicarboxyphenoxy) diphenyl-2,2-propane dianhydride; etc. and mixtures of such dianhydrides.

In addition, aromatic bis(ether anhydride)s included by the above formula are shown by Koton, M. M.; Florinski, F. S.; Bessonov, M. I.; Rudakov, A. P. (Institute of Heteroorganic compounds, Academy of Sciences, U.S.S.R.), U.S.S.R. No. 257,010, Nov. 11, 1969, Appl. May 3, 1967. Such dianhydrides are also shown by M. M. Koton, F. S. Florinski, Zh. Org. Khin; 4(5),774 (1968).

Organic diamines of the above formula, include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, 2,4-bis(-amino-t-butyl) toluene, bis(p-amino-t-butylphenyl)ether, bis(p-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene bis(4-aminocyclohexyl)methane, 3-methylheptamethylenediamine, 4,4-dimethylheptamethylenediamine, 2,11-dodecanediamine, 2,2 dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis (3-aminopropyl)amine, hexamethylenediamine, heptamethylenediamine, nonamethylenediamine, decamethylenediamine, bis(3-aminopropyl) tetramethyldisiloxane, bis(4-aminobutyl) tetramethyldisiloxane, and the like.

In general, the reactions can be advantageously carried out employing well-known solvents, e.g., o-dichlorobenzene, m-cresol/toluene, etc. in which to effect interaction between the dianhydrides and the diamines, at temperatures of from about 100° C. to about 250° C. Alternatively, the polyetherimides can be prepared by melt polymerization of any of the above dianhydrides with any of the above diamine compounds while heating the mixture of the ingredients at elevated temperatures with concurrent intermixing. Generally, melt polymerization temperatures between about 200° C. to 400° C. and preferably 230° C. to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mole percent) of diamine can be employed resulting in the production of polyethermides having terminal amine groups. Generally, useful polyetherimides have an intrinsic viscosity greater than 0.2 deciliters per gram, preferably 0.35 to 0.60, or 0.7 deciliters per gram or even higher when measured in m-cresol at 25 C.

The second component of this blend composition is a polyester.

The polyesters utilized in the process of the present invention are derived from cyclohexanedimethanol and are prepared by condensing either the cis- or trans-isomer (or a mixture thereof) of, for example, 1,4-cyclohexanedimethanol with a carbocyclic dicarboxylic acid or ester so as to produce a polyester having recurring units having the following formula II:

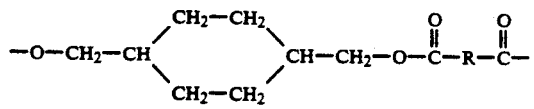

wherein the substituted cyclohexane ring is selected from the group consisting of the cis- and trans-isomers thereof and R represents an organic radical containing from 6 to 20 carbon atoms which is the decarboxylated residue derived from a carbocyclic dicarboxylic acid or ester.

The preferred polyester resins may be derived from the reaction of a mixture of the cis-trans-isomers of 1,4-cyclohexanedimethanol with a mixture of iso- and terephthalic acids. These polyesters have recurring units of the formula III:

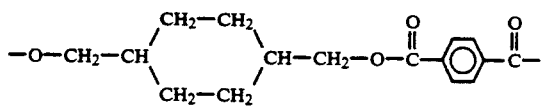

These polyesters can be produced by well known methods in the art such as those set forth in U.S. Pat. No. 2,901,466. The poly (1,4-cyclohexanedimethanol terephthalate) is commercially available. Of course, it is understood that the polyester resins of this invention can be prepared by condensing 1,4-cyclohexanedimethanol and minor amounts of other bifunctional glycols with the carbocyclic dicarboxylic acid. These other bifunctional glycols include the polymethylene glycols containing from 2 to 10 or more carbon atoms such as ethylene glycol, butylene glycol, etc. Preferred polyesters will contain cyclohexane dimethanol units in which the ratio of the trans-/cis-isomer moieties is greater than approximately 70%.

The term "carbocyclic" is used herein in its art recognized sense, that is, it refers to any organic compound whose carbon skeleton is in the form of a closed ring. Obviously, not all the atoms in the closed ring have to be carbon, although the term incorporates both aliphatic and aromatic compounds in which all the atoms are carbon. The preferred number of carbon atoms in the carbocyclic functionality employed in the present invention will generally range between 3 and about 15, with the more preferred number of carbon atoms being 6. In the most preferred embodiment of this invention, the carbocylic dicarboxylic acid or ester is a hexacarbocyclic dicarboxylic acid or ester.

Examples of hexacarbocyclic dicarboxylic acids or esters wherein the carboxy radicals are attached in para relationship to a hexacarbocyclic residue indicated by R in formula (II) include terephthalic acid, trans-hexahydroterephthalic acid, 4,4'-sulfonyldibenzoic acid, 4,4'-diphenic acid, 4,4'-benzophenone dicarboxylic acid, 1,2-di(p-carboxyphenyl)ethane, 1,2-di(p-carboxyphenyl)ethane, 1,2-di(p-carboxyphenoxy)-ethane, 4,4'-dicarboxydiphenyl ether, etc. and mixtures of these. All of these acids contain at least one hexacarbocyclic nucleus. Fused rings can also be present such as in 1,4-, 1,5 or 2,6-napthalenedicarboxylic acid. The hexacarbocyclic conventionally used to mold normally solid thermoplastic compositions.

The composition of the present invention may also optionally include, as a third component of the composition, at least one mineral reinforcing agent, preferably a glass reinforcing agent. Suitable mineral reinforcing agents for use in the present invention include fillers such as talc, mica, wollastinite, asbestos and clay. Other suitable mineral reinforcing agents include fibrous materials such as ceramic filaments, carbon fibers, glass flake and milled glass. The preferred mineral reinforcing agent is fibrous (filamentous) glass. Filamentous glass, is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcements are made by mechanical pulling. The filament diameters range from about 0.00012 to 0.00075 inch, but this is not critical to the present invention. The length of the glass filaments is also not critical to the invention. However, in preparing the molding compositions, it is convenient to use the filamentous glass in the form of chopped strands of from about one-eighth to about two inches long. In articles molded from the compositions, on the other hand, even shorter lengths will be encountered because, during compounding considerable fragmentation will occur. This is desirable, however, because the best properties are exhibited by thermoplastic injection molded articles in which the filament lengths lie between about 0.0005 to 0.250 inch.

It should be understood that the composition obtained according to this invention may contain one or more conventional additives such as, for example, antioxidants, carbon black, agents, plasticizers, rubbery impact modifiers, lubricity promoters, color stabilizers, ultraviolet absorbers, X-ray opacifiers, dyes, pigments, fillers, mold release agents, nucleants, and the like.

Suitable stabilizers include phenol derivatives which include 3,5-di-tert-butyl-hydroxy hydrocinnamic triester with 1,3,5-tris-(2-hydroxyethyl-s-triazine-2,4,6-(1H, 3H, 5H) trione; 4,4'-bis-(2,6-ditertiary-butylphenol); 1,3,5-trimethyl-2,4,6-tris-(3,5-ditertiary-butyl-4-hydroxylbenzyl)benzene and 4,4'-butylidene-bis (6-tertiary-butyl-m-cresol). Mixtures of hindered phenols with esters or thiodipropionic, mercaptides and phosphite esters or particularly useful. Additional stabilization to ultraviolet light can be obtained by compounding with various UV absorbers such as substituted benzophenones and/or benzotriazoles.

Particularly useful stabilizers are hindered phenols which include phenols of the formula

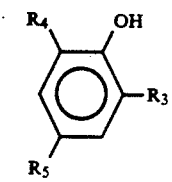

wherein $R_3$ and $R_4$ are hydrocarbon groups having from one to about 20 carbon atoms, and $R_5$ is a hydrogen atom or a hydrocarbon group having from one to about 20 carbon atoms, and bisphenol of the formula

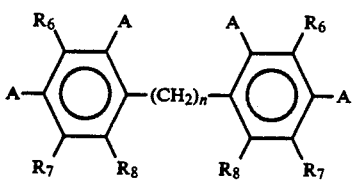

wherein $R_6$, $R_7$ and $R_8$ are each a hydrogen atom or a hydrocarbon group having from one to about 20 carbon atoms, one of the two A's on each ring is a hydroxyl group and the other A on each ring is a hydrogen atom or a hydrocarbon group having from one to about 20 carbon atoms; and n is an integer of from 0 to about 20. Another particularly suitable stabilizer is sodium dihydrogen phosphate which has utility as a melt stabilizer.

The invention is further illustrated by the following Examples, which are not intended to be limiting. Of the following, Example 2 exemplifies the present invention. Example 1 illustrates the polyetherimide resin of the present invention being modified by a polyester resin not utilized in the present invention. Likewise, Example 3, which consists of polyetherimide resin not further modified by a polyester or any other resin, is presented for comparative purposes only and is not to be construed as part of the present invention.

The polyetherimide (indicated as PEI) composition utilized in all of the Examples was Ultem ® 1000, from General Electric Company, a polyetherimide of the formula

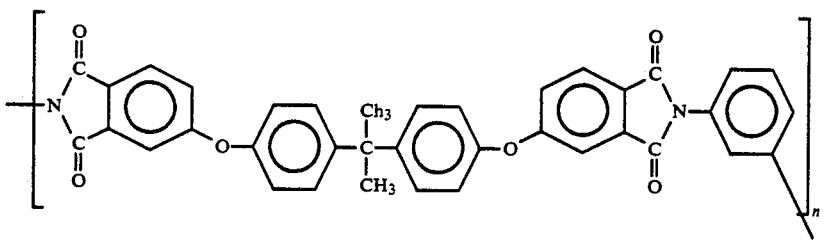

wherein "n" is the degree of polymerization, which corresponds to a number-average molecular weight ($M_n$) of approximately 19,200 (measured by the method of vapour pressure osmosis). The relative solution viscosity is 1,228, measured in methylene chloride at 25° C. in a concentration of 0.5 g per 100 ml of solvent.

The polyester that was used in the blend of Example 1, which is not a part of the present invention, was Valox ® 315 resin, which is available from the General Electric Company and which is a tradename for poly(1,4-butylene terephthalate) (PBT) resin.

The polyester that was used in the blend of Example 2, which is part of the present invention, was Eastman 3879, which is available from Eastman Kodak Company and which is a tradename for poly(1,4 cyclohexanedimethanol terephthalate) (PCT) resin.

The stabilizer (STAB) utilized in Examples 1 and 2 was sodium dihydrogen phosphate.

In Examples 1 and 2, the compositions were prepared by melt blending the PEI resin and the stabilizer in a rear feed throat and then further blending the indicated polyester downstream using an Egan single screw extruder equipped with a downstream feeder at approximately 580°-650° F. Test specimens were prepared by injection molding in accordance with the proper ASTM specifications, using 550°-650° F. barrel temperatures and approximately 200° F. mold temperatures.

The following ASTM methods were used in determining the physical characteristics of the compositions:

| Unnotched Izod | ASTM | D256 |
| Tensile Elongation | ASTM | D638 |
| Tensile Strength | ASTM | D638 |

The amount of each of the components in each Example, as set forth on a percent by weight basis, plus the test results for each Example are set forth in the Table below:

TABLE

| | Example No. | | |
|---|---|---|---|
| | 1 | 2 | 3 |
| PEI | 79.7 | 79.7 | 100 |
| PBT | 20.0 | — | — |
| PCT | — | 20.0 | — |
| STAB | 0.3 | 0.3 | — |
| Unnotched Izod (ft/lbs/in) | 10.67 | NB | 35.9 |
| Tensile Elongation % | 28.9 | 105.6 | 87.5 |
| Tensile Strength, psi | 15,111 | 14,590 | 16,830 |

NB = no break

The above test results clearly indicate that the unnotched izod strength of the composition of the present invention is unexpectedly superior to the unnotched izod strength of either the unmodified PEI composition or the PEI modified with a polyester resin that is not utilized in the present invention, specifically PBT. As indicated, for all the physical properties tested, the polyetherimide resin modified with PBT resin exhibited inferior results when compared to the unmodified PEI resin. Therefore, it was unexpected that modifying the PEI resin with the PCT resin should produce a composition having properties that were comparable to or, in the case of unnotched izod impact strength, clearly superior to the unmodified PEI compositions.

It is to be understood that modifications may be made in the particular embodiments of the invention described which are within the full intended scope of the appended claims.

What is claimed is:

1. A composition comprising (a) a polyetherimide having repeating units of the formula:

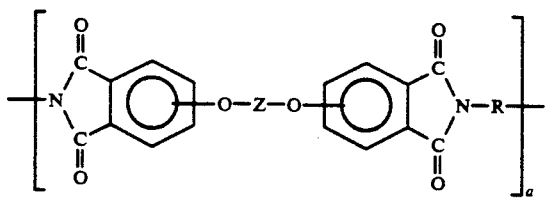

where "a" represents a whole number in excess of 1, Z is a member selected from the class consisting of (1):

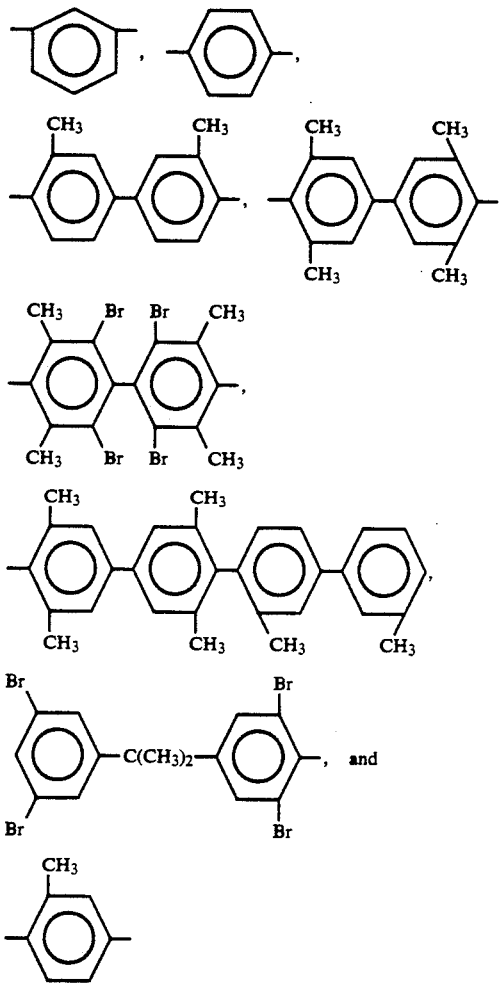

and (2) divalent organic radicals of the formula:

where X is a member selected from the class consisting of divalent radicals of the formulas,

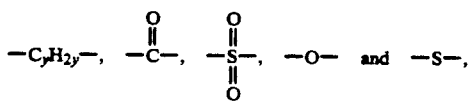

where q is 0 or 1, y is a whole number from 1 to 5, and divalent bonds of the —O—Z—O-radical are in the 3,3', 3,4', 4,3', or the 4,4' positions, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from about 2 to about 20 carbon atoms, $C_2-C_8$ alkylene terminated polydiorganosiloxane, and (3) divalent radicals of the formula:

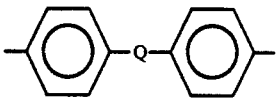

where Q is a member selected from the class consisting of:

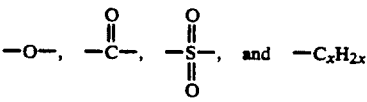

where x is a whole number from 1 to 5 inclusive; and (b) a polyester resin derived predominately from a cyclohexanedimethanol and a carbocyclic dicarboxylic acid.

2. The composition of claim 1 wherein component (b) comprises from about 1% to about 50% by weight of the total of components (a) and (b).

3. The composition of claim 1 wherein component (b) comprises from about 5% to about 40% by weight of the total of components (a) and (b).

4. The composition of claim 1 wherein component (b) comprises from about 10% to about 30% by weight of the total of components (a) and (b).

5. The composition as defined in claim 1 wherein the carbocyclic acid is hexacarbocylic acid.

6. A composition as defined in claim 5 wherein component (b) has repeating units of the formula:

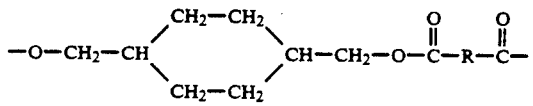

wherein the substituted cyclohexane ring is selected from the group consisting of the cis- and trans-isomers thereof and R represents an organic radical containing from 6 to 20 carbon atoms which is the decarboxylated residue derived from a carbocyclic dicarboxylic acid.

7. A composition as defined in claim 6 wherein the polyester resin has the repeating unit:

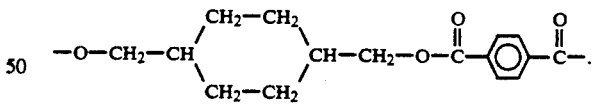

8. A composition as defined in claim 1 wherein the polyester resin contains cyclohexane dimethanol units containing a trans-/cis- isomer ration greater than approximately 70%.

9. The composition of claim 1 further containing a mineral reinforcing agent.

10. The composition of claim 9 wherein the mineral reinforcing agent is a fibrous material.

11. The composition of claim 10 wherein the fibrous material is fibrous glass.

12. The composition of claim 1 further comprising a stabilizer which is a phenol derivative.

13. The composition of claim 12 wherein the stabilizer is a hindered phenol.

14. The composition of claim 1 further containing a stabilizer which is sodium dihydrogen phosphate.

* * * * *